United States Patent [19]
Schreiber

[11] Patent Number: 5,180,261
[45] Date of Patent: Jan. 19, 1993

[54] MOTOR-OPERATED TOOL

[75] Inventor: Wolfgang Schreiber, Stuttgart, Fed. Rep. of Germany

[73] Assignee: C. & E. Fein GmbH & Co., Leuschnerstrasse, Fed. Rep. of Germany

[21] Appl. No.: 789,740

[22] Filed: Nov. 8, 1991

[30] Foreign Application Priority Data

Nov. 28, 1990 [DE] Fed. Rep. of Germany ....... 4037791

[51] Int. Cl.$^5$ .............................................. B23B 45/00
[52] U.S. Cl. ................................. 408/239 R; 279/145
[58] Field of Search ............... 408/239 H, 239 R, 125, 408/124, 141, 14; 279/1 H, 1 Q, 75, 143, 145, 905; 409/231, 232, 233; 51/170 PT

[56] References Cited

U.S. PATENT DOCUMENTS

| 4,583,892 | 4/1986 | Armbruckner | 409/231 X |
| 4,629,375 | 12/1986 | Lieser | 408/239 R |
| 4,888,865 | 12/1989 | Okada et al. | 409/231 X |

FOREIGN PATENT DOCUMENTS 265380 4/1988 European Pat. Off. ............ 408/124

Primary Examiner—Daniel W. Howell
Attorney, Agent, or Firm—Pretty, Schroeder, Brueggemann & Clark

[57] ABSTRACT

A motor-operated tool is provided for tool sockets revolving about an axis, in particular for drills or spanners. The tool comprises a tool head containing a drive spindle. The drive spindle comprises a driving opening for a drive shank of the tool socket and a plurality of ball elements for engaging a part of the drive shank to lock it in the driving opening. The ball elements preferably are adapted to lock the drive shank in the driving opening automatically and to be released by a suitable mechanism. The tool socket is designed as a drill chuck and is provided with key elements for actuating the mechanism.

11 Claims, 4 Drawing Sheets

MOTOR-OPERATED TOOL

The invention relates to a motor-operated tool for tool sockets revolving about an axis, in particular for drills or spanners, the tool having a tool head containing a drive spindle, where the drive spindle comprises a driving opening for a drive shank of the tool socket and snap-in locking means for locking the drive shank in the driving opening against axial movement, the snap-in locking means preferably being adapted to lock automatically as the drive shank is introduced into the driving opening and to be released by a suitable mechanism, and where the tool socket may be designed as a drill chuck.

A tool of the before-mentioned type has been known.

The known tool is capable of receiving alternatively a spanner socket or a drill chuck. The spanner socket merely has the form of a short profiled section whose rear end is adapted to the profile of the driving opening, which may exhibit a hexagonal shape for example, while its front end carries an edge or a crown designed for driving slot bolts or cross-slotted bolts. On the other hand, the chuck is designed in the conventional manner, with the exception that its rear end, instead of being equipped with a screw-type arbor, is equipped with a profiled shank which is adapted to the inner contour of the driving opening.

In the case of the known tool, the drive spindle projects from the tool head toward the front. The projecting end of the drive spindle carries a sleeve which is mounted for displacement in the axial direction. The drive spindle is designed as a ball cage in the area of displacement of the sleeve. The inside of the sleeve exhibits a profile which ensures that when the sleeve is moved axially into a first end position, against the force of a spring, the balls of the ball cage enter the ball cage, thus releasing the driving opening. However, when the sleeve is released so that it is returned to its other end position by the restoring force of the spring, then the balls are pushed inwardly so that they come to project radially beyond the inner contour of the driving opening. This design is matched by a complementary annular groove provided in the profiled section of the spanner or the shank of the drill chuck for receiving the balls when the spanner or the chuck are inserted, whereby the latter are locked against axial movement. This locking engagement will be released only when the sleeve is displaced by the user of the tool in axial direction, against the force of the spring, in order to remove the spanner or the drill chuck from the driving opening.

In the case of the known tool, the forward free end of the drive spindle and the sleeve moving thereon have a diameter which is only slightly larger than that of the profiled section of the spanner or the shank of the drill chuck. This is so because it is desirable in screwing operation that the elements located at the end of the entire tool should have relatively small diameters.

However, while locking and, above all, unlocking of the profiled section of a spanner is generally unproblematic, as the sleeve is freely accessible in the mounted condition of the profiled spanner section, disadvantages are encountered with the known tool when a drill chuck has to be released. For, a drill chuck has a considerably larger diameter than a drive spindle, or the sleeve mounted thereon. Now, when a drill chuck is mounted in the tool head, an area of considerably smaller diameter remains between the tool head and the drill chuck, which area must, however, be rather broad in the axial direction so as to allow the user of the tool to reach into this area with his fingers in order to push back the sleeve and, thus, to unlock the drill chuck.

Such a design is unsatisfactory not only as regards its appearance, but also under safety aspects because the user of the tool may have his fingers trapped if he has to reach into this axially very narrow area between the drill chuck and the tool head for rapidly exchanging a drill chuck and a spanner socket.

Now, it is the object of the present invention to improve a tool of the before-described kind in such a way that these disadvantages are avoided and, in particular, that a higher degree of safety is achieved for the user of such tools.

This object is achieved according to the invention by the fact that the tool socket, which is designed as drill chuck, is provided with actuating means for the mechanism.

This solves the object underlying the present invention fully and perfectly.

For, it is now possible on the one hand, when mounting or removing a spanner socket, to act upon the locking means as such, for example upon a sleeve of relatively small diameter which can be displaced in axial direction, while on the other hand, when a drill chuck is mounted, a remote control can be implemented for the unlocking mechanism so that the user of the tool does not have to reach into the narrow area between the tool head and the drill chuck. In addition, this solution provides the supplementary advantageous effect that the unlocking mechanism does not get soiled so easily.

According to a particularly preferred embodiment of the invention, the mechanism comprises, in a manner known as such, a sleeve which is arranged on the drive spindle for axial displacement thereon and which engages or releases a driving opening by radially displaceable elements, depending on its axial position.

This is the case, in particular, when the sleeve can be displaced along a section of the drive spindle which is configured as a ball cage and when the radially displaceable elements take the form of balls of the ball cage which are subjected to the action of a spring.

Further, it is particularly preferred for these embodiments of the invention if three elements are provided which are spaced over the circumference of the drive spindle by 120°, and if the distal end of the drive shank has the form of a flat square narrow enough to ensure that it will get into contact with only one of the elements during introduction into the driving opening.

This feature provides the advantage that the radially displaceable elements have to perform a very slight evading movement only during introduction of the drive shank because only one of these elements is contacted until finally, when the drive shank possibly enters the driving opening with its full diameter, all of the several radially displaceable elements are urged back. It is thus ensured that the drive shank can be introduced without any mechanical obstacle, at least over a certain axial length, and is given safe guidance for the further insertion movement.

According to certain particularly preferred embodiments of the invention, the actuating means is configured as a key arranged in one circumferential surface of the drill chuck for actuation in radial direction.

This feature provides the advantage that actuation is rendered particularly easy because the user of the tool can grip the circumference of the drill chuck in a very simply way and press in the key in radial direction.

A good effect is achieved in this case when the key can be pivoted in radial direction about an articulation.

This feature leads to a particularly simple design, and this especially when the key is formed integrally with a plastic component and is connected with the remaining portion of the component only by a film hinge.

In addition, it is preferred for this embodiment of the invention if the key is provided, on its end opposite the hinge, with a radial lug which is caused to move with an axial motion component when the key is pressed in.

This feature provides the particular advantage that an actuation in radial direction is translated into an actuation acting in axial direction, which permits the use of the same locking mechanisms that have been used heretofore in tools of the type of interest.

In this respect, it is particularly preferred if the key is arranged in the circumferential surface of a pot-like housing which encloses the sleeve on all sides when the drill chuck is mounted in the tool head.

This feature provides the advantage that while the drive spindle or the locking sleeve projects axially beyond the tool head, an enclosed structure is obtained when the pot-like housing comes to embrace the sleeve and the drive spindle enclosed by the latter. The user of the tool then only has to press the key in the pot-like housing in radial direction in order to displace the sleeve in the housing in axial direction.

According to a further development of this embodiment of the invention, the housing and the tool head have approximately the same diameter so that a satisfactory solution is achieved, optically and practically, without any notable projections in diameter and, above all, without any recessed diameters in the area of the forward end of the tool that may hurt the fingers of the user of the tool.

Finally, it is particularly preferred if two keys are arranged at positions of the circumferential surface which are spaced by 180°.

This feature provides the advantage that the snap-in locking means can be released by the user in an extremely simple way by pressing both keys, for example between his thumb and his index finger.

Other advantages of the invention will appear from the specification and the attached drawing.

It is understood that the features that have been described before and will be explained hereafter may be used not only in the described combinations, but also in any other combination, or individually, without leaving the scope and intent of the present invention.

Certain embodiments of the invention will now be described in more detail with reference to the drawing in which.

Whenever the term motor-operated tool is used in the context of the present invention, this term is meant to describe any tool which is driven electrically, pneumatically or in some other way, regardless of whether the tool is stationary or intended for use as hand tool. Yet, for the purposes of discussing the embodiments of the invention described hereafter, an electrically-operated drilling and screwing machine will be used as an example, although it is understood that this example is not meant to restrict the scope of the present intention.

Figure 1:
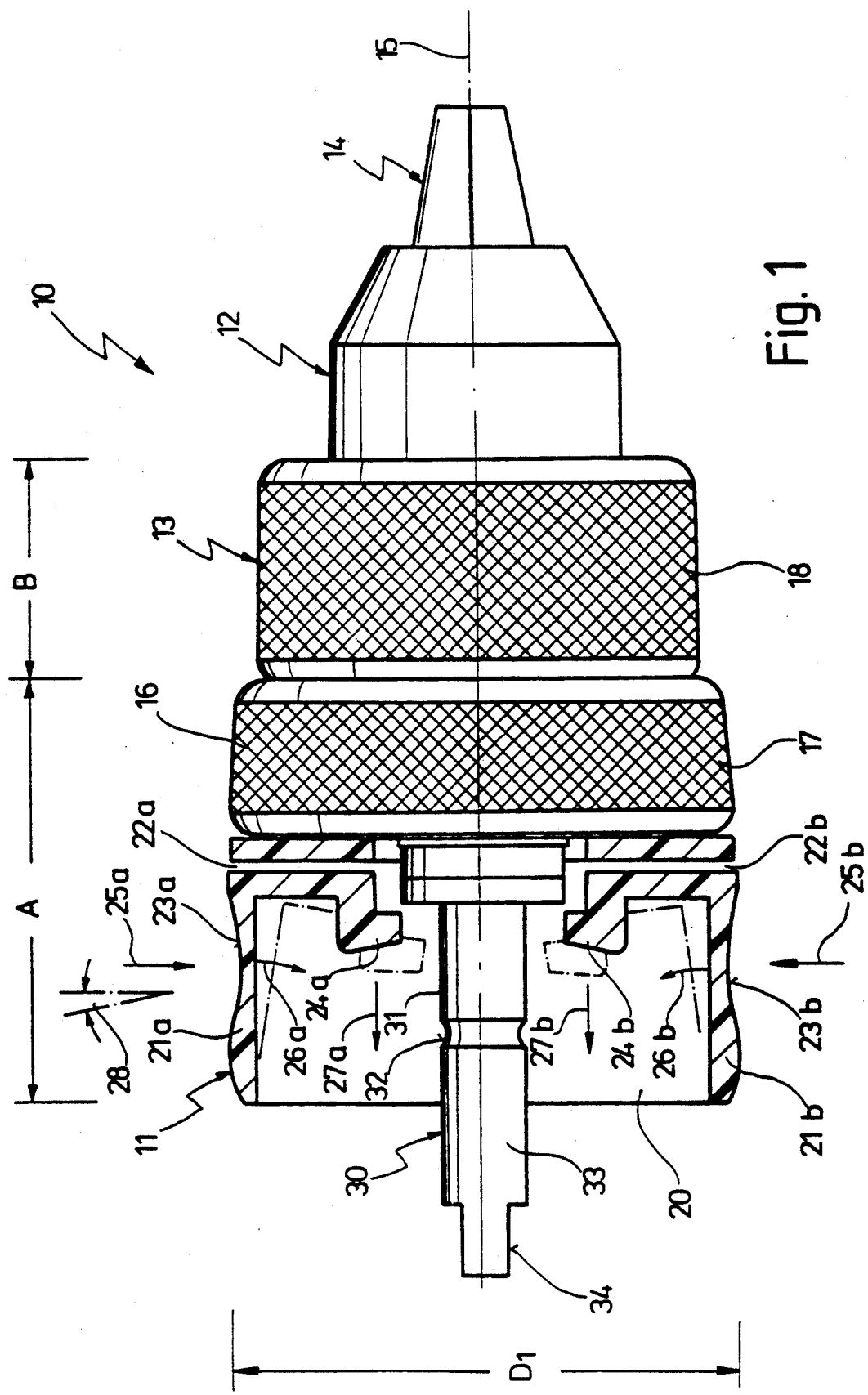
FIG. 1 shows a—partly sectional—side view of a drill chuck of the type that can be used with a tool according to the invention.
Figure 2:
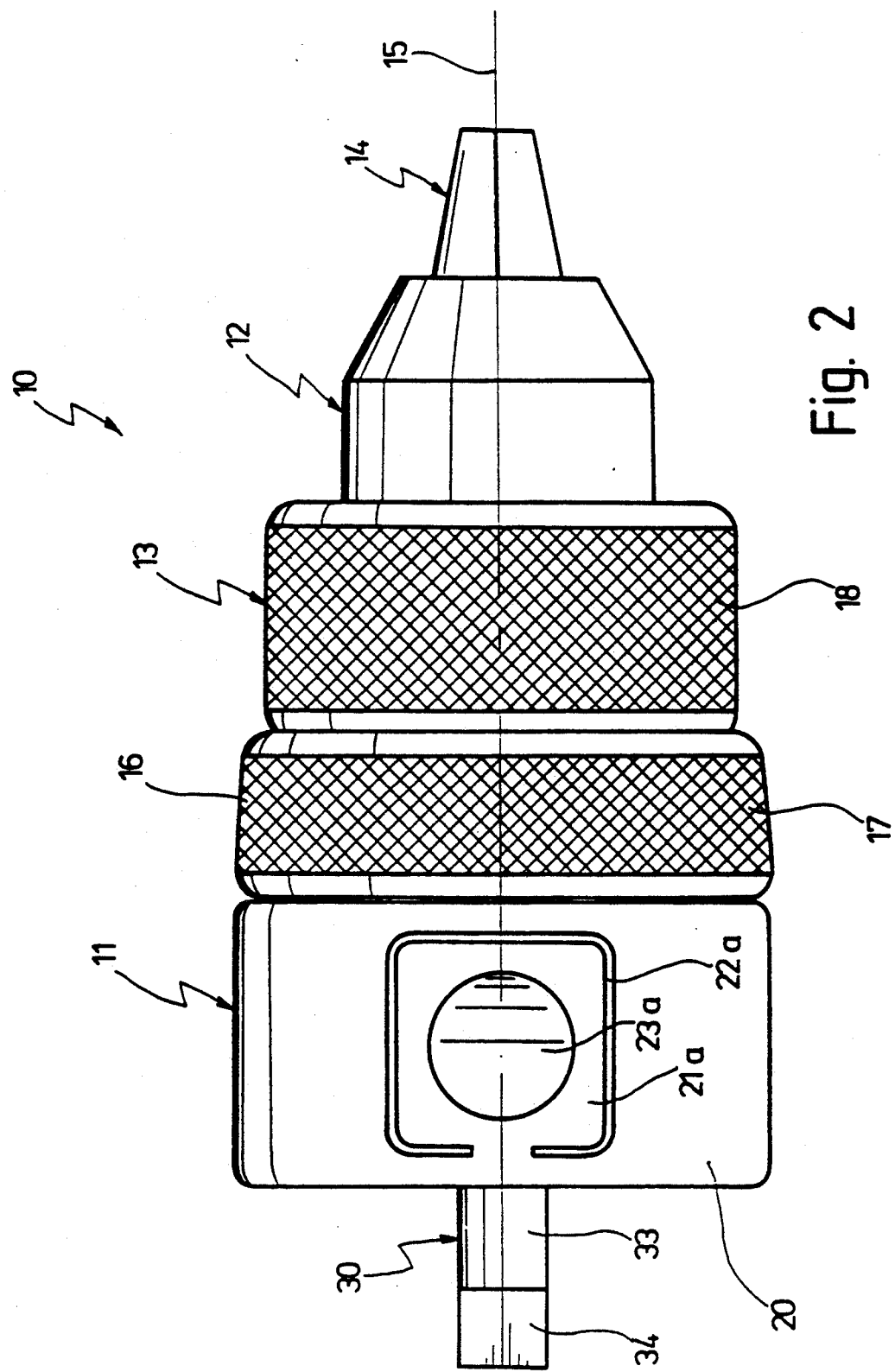
FIG. 2 shows a top view of the drill chuck illustrated in FIG. 1.

In FIGS. 1 and 2, a drill chuck for such a machine is designated generally by 10. The drill chuck 10 is provided at its rear end with a housing 11 which will be described in more detail further below. The forward end of the drill chuck 10 carries a usual chucking head 12 comprising a rotatable chucking ring 13 by means of which clamping jaws 14 can be opened and closed in order to chuck or release a socket which is to be introduced along an axis 15. A ring 16 is connected rigidly with the chucking head 12. The ring 16 and the chucking ring 13 are each provided about their circumference with a corrugation which enables the user of the tool, when chucking or releasing a drill or the like, to rotate these two rings 13, 16 relative to each other and to apply the required torque. Except for the housing 11, the drill chuck 10 exhibits a conventional design.

The housing 11, which preferably consists of a single part made from an elastic plastic material, comprises a rear pot-shaped section 20. Two keys 21a and 21b, which are arranged in the outer circumferential surface of the rear section 20, spaced by 180°, are formed integrally with the housing in the illustrated embodiment of the invention. This is achieved by the fact that the keys 21a, 21b are separated from the remaining rear section 20 by slots 22a, 22b, respectively, except for a remaining narrow web. A recess 23a, 23b provided in the middle of each of the keys 21a, 21b enables the keys 21a, 21b to be found by the user's fingers without the user having to look for them.

Molded on the inner ends of the keys 21a, 21b, opposite the web, are lugs 24a, 24b which extend in radially inward direction into the rear section 20 and whose free ends are again bent off axially toward the web, and are provided with an oblique end face. The oblique end face is inclined at an angle 28 of, preferably, approximately 10° relative to a plane extending radially to the axis 15.

As will become apparent from FIG. 1, the keys 21a, 21b can be pressed in the radial direction indicated by arrows 25a, 25b. The keys 21a, 21b are then pivoted about the articulation formed by the web, as indicated by arrows 26a, 26b. In the position now assumed, which is indicated in FIG. 1 by the dash-dotted lines, the lugs 24a, 24b have been pivoted in radially inward direction, but their hook-like inner ends simultaneously have run through an axial motion component, as indicated by arrows 27a, 27b.

The rear end of the drill chuck 10 is further provided with a shank 30 which is connected with the chucking head 12 to rotate therewith. Viewed in the direction from the ring 16, the axial shank 30 exhibits initially a first cylindrical section 31, then a narrow annular groove 32, followed by a second cylindrical section 33, and finally a flat square 34 forming its rear end. The shape of the flat square 34 is obtained by reducing the previously cylindrical section at the top and the bottom by a segment-shaped portion.

Figure 3:
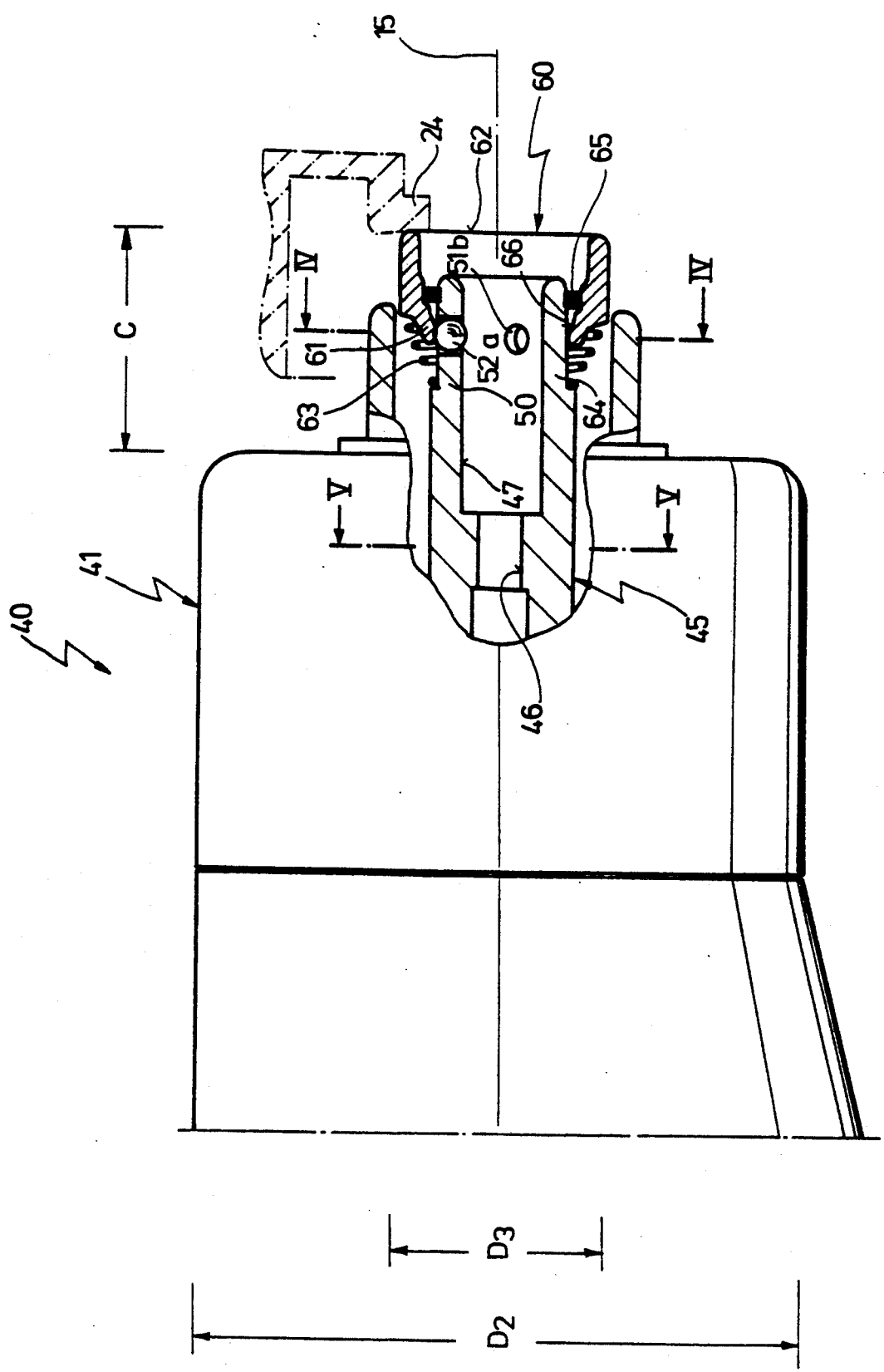
FIG. 3 shows a—partly sectional—side view of a tool head of the type that can be used in combination with the drill chuck of FIGS. 1 and 2.

Regarding now FIG. 3, reference numeral 40 indicates the tool in its entirety, i.e. in the illustrated example an electric hand tool. The tool 40 is equipped at its forward end with a tool head 41 which includes a hollow drive spindle 45 which extends along the axis 15 and which is connected to an electric drive motor in a manner not illustrated in detail.

The drive spindle 45 is provided with a flat square section 46—at the left in FIG. 3—whose inner contour is adapted to the outer contour of the flat square 34. At the right in FIG. 3, the flat square 46 is followed by a cylindrical section 47.

Figure 4:
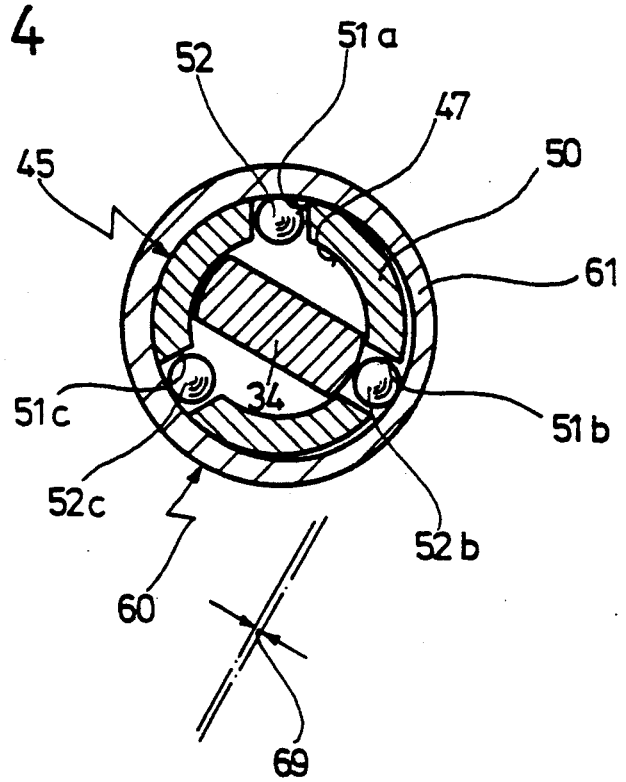
FIG. 4 is a sectional view of a detail, taken along line IV—IV in FIG. 3, in enlarged scale.
Figure 5:
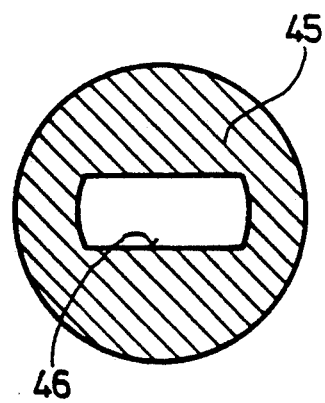
FIG. 5 shows a representation similar to that of FIG. 4, but along line V—V in FIG. 3.

In the area of the cylindrical section 47, the drive spindle 45 projects axially beyond the tool head 41. The forward end of the drive spindle 45, which projects beyond the tool head 41, is configured as a ball cage 50, as can be clearly seen in FIGS. 3 and 4. The ball cage 50 is provided with three radial bores 51a to 51c which are distributed over the periphery spaced by 120° and which accommodate balls 52a to 52c. It goes without saying that FIG. 4 showing this arrangement is to be understood only as a diagrammatic representation which does not show fuller constructional details.

The forward end of the drive spindle 45 is adapted, in the area of the ball cage 50, for receiving a sleeve 60 which can be fitted thereon as locking sleeve. The left end of the sleeve 60—as viewed in FIG. 3—is provided with a rear section 61 which, in the position illustrated in FIG. 3, urges the balls 82a to 82c inwards, through the radial bores 51a to 51c, so that they project in radially inward direction into the cylindrical portion 47.

The right-hand end of the sleeve 60, as viewed in FIG. 3, is formed by a forward edge 62. A conical coil spring 63 bears on the one hand against an annular shoulder 64 of the drive spindle 45 and on the other hand against the rear portion 61 of the sleeve 60. The coil spring 63 is configured as compression spring which, in the position illustrated in FIG. 3, urges the sleeve 60 to the right and against a retaining ring 65 which is rigidly connected with the drive spindle 45 against axial movement.

In the illustration of FIG. 3, the sleeve 60 is provided on its inside, at the left of the retaining ring 65, with a conical enlarged area 66. Now, when the sleeve 60 is displaced against the action of the coil spring 63 from its right end position illustrated in FIG. 3 to the left, the balls 52a to 52c can migrate in outward direction through the radial bores 51a to 51c, being now no longer blocked on their radial way to the outside, due to the conical enlarged area 66 of the sleeve 60.

Further, the arrangement of the sleeve 60 on the forward end of the drive spindle 45 is selected in such a way that the sleeve 60 is supported with a slight play.

Now, when a short profiled spanner section is to be introduced into the driving opening formed by the sections 46 and 47 of the drive spindle 45, this can be done in the conventional way by moving the freely accessible sleeve 60 to the left in FIG. 3 using one hand, so that the other hand is available for introducing the profiled spanner section into the cylindrical section 47. Thereafter, the sleeve 60 can be released, with the result that the balls 52a to 52c engage a matching annular groove in the profiled spanner section.

For removing the profiled spanner section, the sleeve 60, which is still freely accessible, can be slid back to the left in order to release the locked condition by means of the balls 52a to 52c.

However, when a drill chuck has to be clamped, the arrangement of the drill chuck according to the invention, as shown in FIGS. 1 and 2, has the following function:

Initially it should be noted that the flat square 34 provided on the rear end of the shank 30 is sized in such a way that when being introduced into the cylindrical section 47 it will come into engagement with only one of the balls, for example the ball 52b, as illustrated in FIG. 4. To this end, the flat square 34 must be given a shape narrow enough to ensure that, as is clearly shown in FIG. 4, it cannot get into contact with more than one of the three balls 51a to 51c, regardless of its position.

This of course has the effect that only the one ball, namely ball 52b in FIG. 4, will be urged in radially outward direction. However, since the sleeve 60 is supported in the area of its rear section 61 with a slight radial play, as mentioned before, the ball 52b is permitted to yield because the rear section 61 can assume a slightly eccentric position 69 relative to the ball cage 50, as is illustrated more clearly in FIG. 4.

This means that, as long as only the flat square 34 is introduced into the driving opening of the drive spindle 45, the locking mechanism of the elements 50 to 52 will remain inactive. Consequently, the shank 30 can be introduced into the cylindrical section 47 over a considerable axial length without having to give regard to the locking means.

Now, in the inserted condition of the drill chuck 10, the lugs 24 are in contact with the forward edge 62 of the sleeve 60, as indicated by the dash-dotted lines in FIG. 3. If in this condition, as illustrated in FIG. 1, the keys 21a, 21b are actuated in radial direction, as indicated by arrows 25a, 25b, this gives rise to the before-mentioned axial motion component indicated by arrows 27a, 27b, with the result that the sleeve 60 is displaced to the left and the balls 52a to 52c are released again.

Consequently, it is possible to release the locked condition of the balls 52a to 52c when one or both of the keys 21a, 21b have been pressed.

In FIG. 1, the area where the drill chuck 10 can be gripped by the user's hand, is indicated by A, while B indicates the area which has to be gripped by the other hand, for example for chucking or releasing a drill between or from the clamping jaws 14. Since in the case of conventional drill chucks the width of the left section A, as viewed in FIG. 1, is considerably narrower, being limited to the width of the ring 16, the attached housing 11 provides an axially larger area which can be gripped by the user's hand, and this clearly leads to improvement handling.

Reference $D_1$ in FIG. 1 indicates the outer diameter of the drill chuck in the areas A and B, in particular in the area of the housing 11.

In contrast, reference $D_2$ in FIG. 3 indicates the outer diameter of the tool head 41, while $D_3$ indicates the outer diameter of the sleeve 60.

It will be readily appreciated that without the housing 11 the area obtained between the tool head 41 and the ring 16 would be that indicated by C in FIG. 3, with a diameter $D_3$ which is considerably smaller than the adjoining diameters $D_1$ and $D_2$ of the drill chuck 10 and the tool head 41.

As compared to this situation, the presence of the housing 11 leads to the condition that the diameter is reduced only slightly from $D_2$ to $D_1$, without there being any gaps formed by areas of reduced diameter. Consequently, the invention is particularly useful for such tools 40 where elements of smaller diameter $D_3$ project beyond the tool head 41 by an amount C.

I claim:

1. A motor-operated tool, comprising:

a tool head, said tool head including a drive spindle having a driving opening;

a tool socket revolving about an axis and being designed as a drill chuck for clamping drills, spanners or the like, said tool socket including:

a drive shank fitting through said driving opening of said drive spindle;

snap-in locking means provided on said drive spindle for locking said drive shank against axial movement by engaging said drive shank when said drive shank is introduced into said driving opening;

a release mechanism for releasing said drive shank from said drive spindle; and actuating means for actuating said release mechanism;

wherein said release mechanism comprises a sleeve and a plurality of radially displaceable elements, said sleeve being arranged on said drive spindle for axial displacement thereon and engaging or releasing said driving opening by said radially displaceable elements, depending on the axial position of said sleeve;

wherein said drive spindle includes a section which is configured as a ball cage;

wherein said radially displaceable elements are balls being held in said ball cage and being impinged by a spring element; and wherein said sleeve is displaceable along said ball cage.

2. Tool according to claim 1, wherein three of said radially displaceable elements are provided which are spaced over the circumference of said drive spindle by 120°, and wherein said drive shank includes a distal end having the form of a flat square narrow enough to ensure contact with only one of said elements during introduction into said driving opening.

3. A motor-operated tool, comprising:

a tool head, said tool head including a drive spindle having a driving opening;

a tool socket revolving about an axis and being designed as a drill chuck for clamping drills, spanners or the like, said tool socket including:

a drive shank fitting through said driving opening of said drive spindle;

snap-in locking means provided on said drive spindle for locking said drive shank against axial movement by engaging said drive shank when said drive shank is introduced into said driving opening;

a release mechanism for releasing said drive shank from said drive spindle; and actuating means for actuating said release mechanism;

wherein said release mechanism comprises a sleeve and a plurality of radially displaceable elements, said sleeve being arranged on said drive spindle for axial displacement thereon and engaging or releasing said driving opening by said radially displaceable elements, depending on the axial position of said sleeve;

wherein three of said radially displaceable elements are provided which are spaced over the circumference of said drive spindle by 120°; and wherein said drive shank includes a distal end having the form of a flat square narrow enough to ensure contact with only one of said elements during introduction into said driving opening.

4. A motor-operated tool, comprising:

a tool head, said tool head including a drive spindle having a driving opening;

a tool socket revolving about an axis and being designed as a drill chuck for clamping drills, spanners or the like, said tool socket including:

a drive shank fitting through said driving opening of said drive spindle;

snap-in locking means provided on said drive spindle for locking said drive shank against axial movement by engaging said drive shank when said drive shank is introduced into said driving opening;

a release mechanism for releasing said drive shank from said drive spindle;

actuating means for actuating said release mechanism; and wherein said actuating means is designed as a key element arranged on one circumferential surface of said drill chuck for actuating in a radial direction.

5. Tool according to claim 4, wherein said key element is pivotable in a radial direction about an articulation.

6. Tool according to claim 5, wherein said key element includes an end opposite said articulation, and wherein a lug is provided on said end extending radially and which is caused to move axially when said key element is pressed inwardly.

7. Tool according to claim 4, wherein said drill chuck includes a pot-like housing, wherein said key element is provided on a circumferential surface of said housing which encloses said sleeve on all sides when said drill chuck is mounted in said tool head.

8. Tool according to claim 6, wherein said drill chuck includes a pot-like housing, wherein said key element is provided on a circumferential surface of said housing which encloses said sleeve on all sides when said drill chuck is mounted in said tool head.

9. Tool according to claim 7, wherein said housing and said tool head have approximately the same diameter.

10. Tool according to claim 4, wherein two key elements are provided at two positions on said circumferential surface, each position being spaced from the other position by 180°.

11. Tool according to claim 9, wherein two key elements are provided at two positions on said circumferential surface, each position being spaced from the other position by 180°.

* * * * *